A. B. HOUSE.
MOTOR FIRE ENGINE.
APPLICATION FILED JULY 8, 1919.

1,357,982. Patented Nov. 9, 1920.

WITNESS

INVENTOR
Albert B. House
BY
ATTORNEYS

UNITED STATES PATENT OFFICE.

ALBERT B. HOUSE, OF BROOKLYN, NEW YORK, ASSIGNOR TO INTERNATIONAL MOTOR COMPANY, OF NEW YORK, N. Y., A CORPORATION OF DELAWARE.

MOTOR FIRE-ENGINE.

1,357,982.   Specification of Letters Patent.   Patented Nov. 9, 1920.

Application filed July 8, 1919. Serial No. 309,485.

*To all whom it may concern:*

Be it known that I, ALBERT B. HOUSE, a citizen of the United States, residing in the borough of Brooklyn of the city of New York, in the State of New York, have invented certain new and useful Improvements in Motor Fire-Engines, of which the following is a specification, reference being had to the accompanying drawing, forming a part hereof.

This invention relates to motor fire engines and particularly engines provided with chemical fire apparatus. The invention has for its general object to provide in fire apparatus of this character devices which are simple in construction and easy of control for the purpose of permitting a stream of water to be diverted from the connection to the fire pump through a supplemental hose for washing or other purposes, into the chemical tank, or through the chemical fire hose for the purpose of flushing it out. The invention will be described in greater detail in connection with one embodiment thereof in a fire apparatus in which the connections and controlling valves are so incorporated as to permit the accomplishment of the stated objects. In the drawing—

Figure 1:
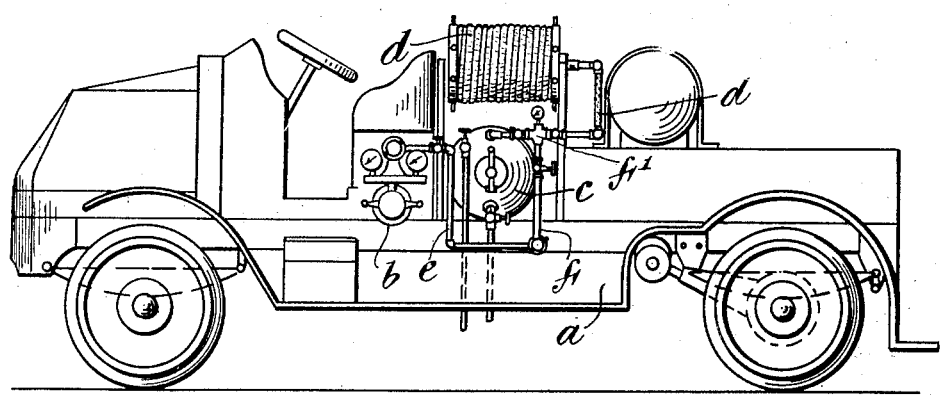
Figure 1 represents a view in side elevation of a chemical fire apparatus provided with the improved devices.
Figure 2:
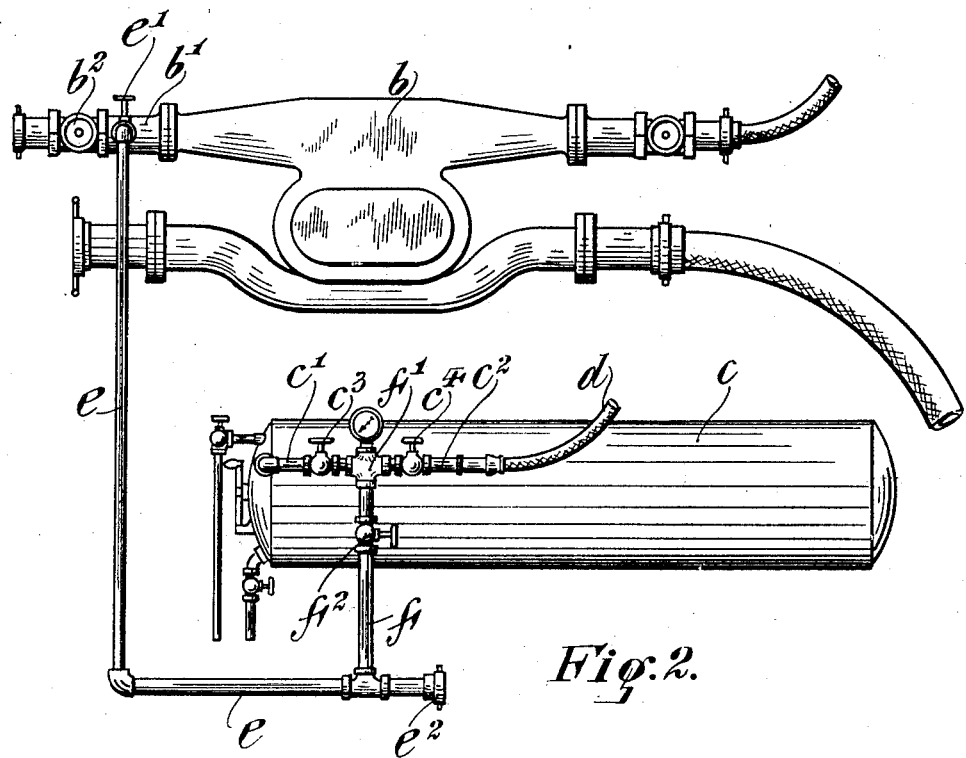
Fig. 2 is a view on a somewhat larger scale of the fire pump and the chemical tank showing particularly the association therewith of the improved devices.

The fire truck $a$ has mounted thereon in any convenient manner the fire pump $b$ and the chemical tank $c$ from which lead pipes $c'$, $c^2$, to one of which pipes $c^2$ is attached the chemical fire hose $d$. To the pump, as in the discharge pipe $b'$, at one side, is connected, preferably at a point between the pump $b$ and the controlling discharge valve $b^2$, a pipe $e$ of suitable size for the purposes to be described. The flow of water through the pipe $e$ may be controlled by a hand valve $e'$, preferably located within convenient reach of the attendant at a point somewhat near the discharge pipe $b'$. The pipe $e$ may carry at its end a hose coupling $e^2$ to which may be attached, when required, a flushing hose (not illustrated) for washing or other purposes. From the pipe $e$ leads a pipe $f$ connected to the pipes $c'$, $c^2$, as by a suitable coupling $f'$, the flow of water through the pipe $f$ to the pipes $c'$, $c^2$ being controlled by a hand valve $f^2$. In the pipe $c'$, at a point between the coupling $f'$ and the tank $c$, is located a hand valve $c^3$ to control the flow of water from the coupling $f'$ to the tank. In the pipe $c^2$, at a point between the coupling $f'$ and the chemical hose $d$, is located a hand valve $c^4$ to control the flow of water from the coupling $f'$ to the hose.

From the description given, it will be evident that regardless of the particular form and arrangement which the various pipe connections and valves take, it is possible in accordance with the invention to lead a stream of water from the discharge pipe $b'$ to the pipe coupling $e^2$ for the purpose of employing the stream in a flushing hose for washing or other purposes, the valve $f^2$ at this time being closed. When the pipe $e$ is closed off by the hose coupling or cap $e^2$ and the valve $f^2$ opened the water from the discharge pipe $b'$ may be led through the chemical fire hose $d$, the valve $c^3$ being closed and the valve $c^4$ opened. Such a stream of water is required for the purpose of flushing out the chemical hose $d$, thereby expelling all injurious matter therein and facilitating its easy cleansing. If desired, the valve $c^4$ might be closed and the valve $c^3$ opened permitting the same stream of water to be directed into the chemical tank $c$. The apparatus described is simple and the controls easy so that by a single tapping of the pump water line an auxiliary stream of water for any one of the purposes mentioned may be derived.

I claim as my invention:

1. In a chemical fire apparatus, a fire pump having fire hose leading directly from it, a chemical tank having a connection for chemical hose, an auxiliary pipe leading from the fire pump to the connection for the chemical hose, a valve controlling the auxiliary pipe, a valve between the connection for the chemical hose and the chemical tank, and a valve in the connection for the chemical hose between the point at which the auxiliary pipe enters said connection and the chemical hose.

2. In a chemical fire apparatus, a fire pump having fire hose leading directly from it, a chemical tank having a connection for chemical hose, an auxiliary pipe leading from the fire pump to the connection for the chemical hose having an independent hose coupling for attachment of flushing hose, a valve controlling the auxiliary pipe, a valve between the connection for the chemical hose and the chemical tank, and a valve in the connection for the chemical hose between the point at which the auxiliary pipe enters said connection and the chemical hose.

This specification signed this 30th day of June, A. D. 1919.

ALBERT B. HOUSE.